United States Patent [19]

Leas, Jr.

[11] Patent Number: 4,767,230
[45] Date of Patent: Aug. 30, 1988

[54] SHAFT COUPLING

[75] Inventor: Floyd S. Leas, Jr., Abington, Pa.

[73] Assignee: Algonquin Co., Inc., Chestertown, Md.

[21] Appl. No.: 66,256

[22] Filed: Jun. 25, 1987

[51] Int. Cl.⁴ ............................................. B25G 3/00
[52] U.S. Cl. ...................................... 403/16; 403/19; 403/259; 403/337
[58] Field of Search ................... 403/16, 19, 336, 337, 403/259, 370

[56] References Cited

U.S. PATENT DOCUMENTS

| 365,037 | 6/1887 | Allington . | |
| 923,633 | 6/1909 | Edison | 403/336 |
| 985,491 | 2/1911 | Andrade, Jr. . | |
| 1,318,455 | 10/1919 | Macdonald . | |
| 1,326,626 | 12/1919 | Wolfe . | |
| 1,401,302 | 12/1921 | Axelson . | |
| 2,447,299 | 8/1948 | Williams | 403/370 X |
| 2,449,284 | 9/1948 | Dorman . | |
| 2,515,303 | 7/1945 | Isnard . | |
| 3,143,366 | 8/1964 | Nichols . | |
| 3,851,983 | 12/1974 | MacKenzie . | |
| 3,942,466 | 3/1976 | Bunyan . | |
| 4,120,082 | 10/1978 | Bond . | |
| 4,121,532 | 10/1978 | Coryell, III . | |
| 4,360,349 | 11/1982 | Hansson . | |
| 4,411,549 | 10/1983 | Sheppard . | |

FOREIGN PATENT DOCUMENTS

| 13356 | 5/1900 | Sweden | 403/370 |
| 651188 | 3/1951 | United Kingdom | 403/337 |

Primary Examiner—Andrew V. Kundrat
Attorney, Agent, or Firm—Jones, Tullar & Cooper

[57] ABSTRACT

A shaft coupling assembly particularly intended for use with a taper shaft utilizes a tapered inner bore having an internally threaded portion for receipt of a torque applying jacking plug, and one or more impact receiving striking surfaces to facilitate removal of the shaft coupling from a shaft. The contemporaneous application of torque to the coupling through the jacking plug and impact to the coupling through the striking surfaces breaks the coupling loose from the taper shaft, even in situations where there is only limited space in which to deliver impact blows.

11 Claims, 3 Drawing Sheets

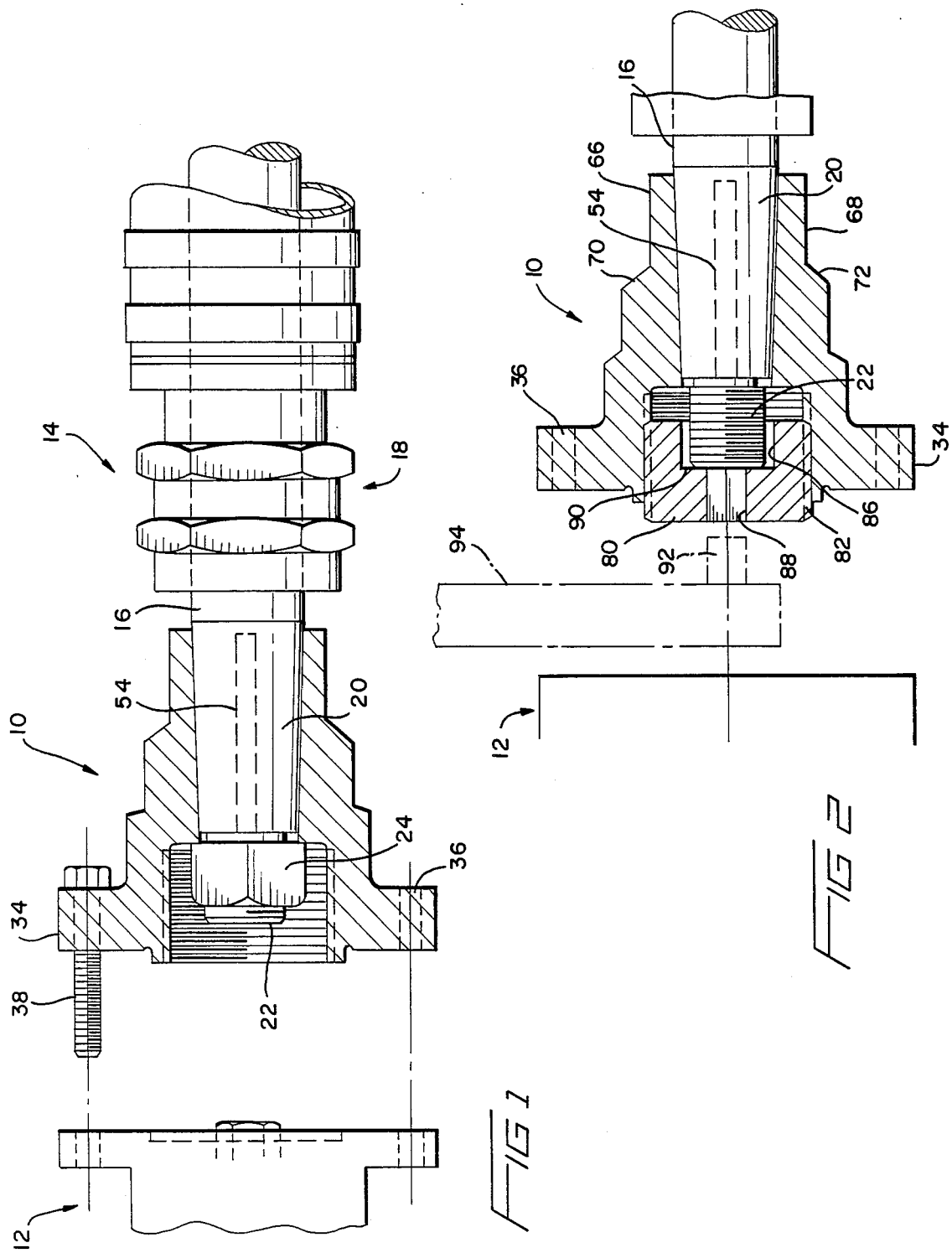

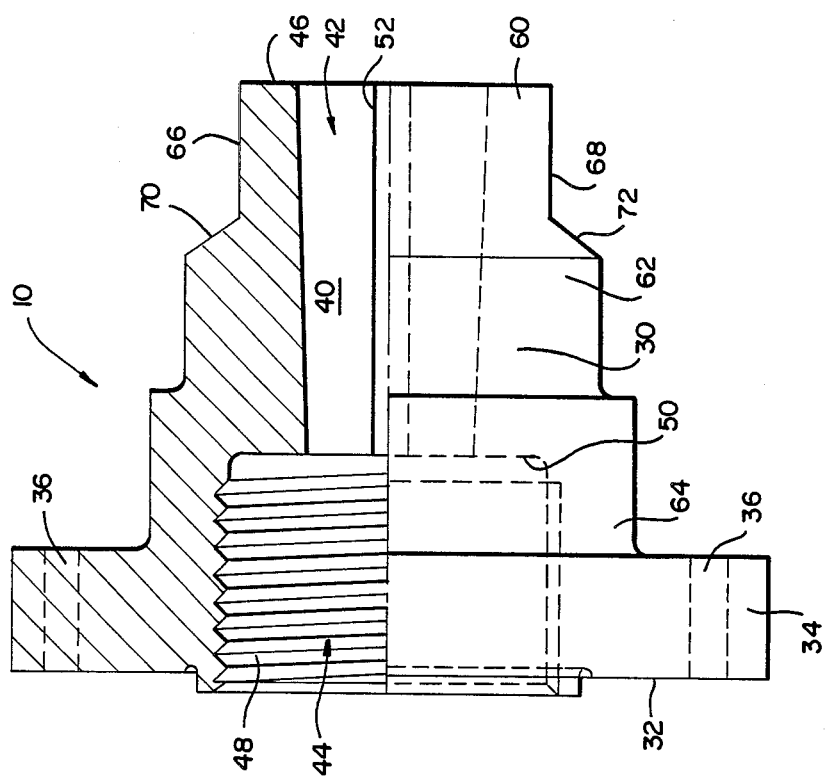
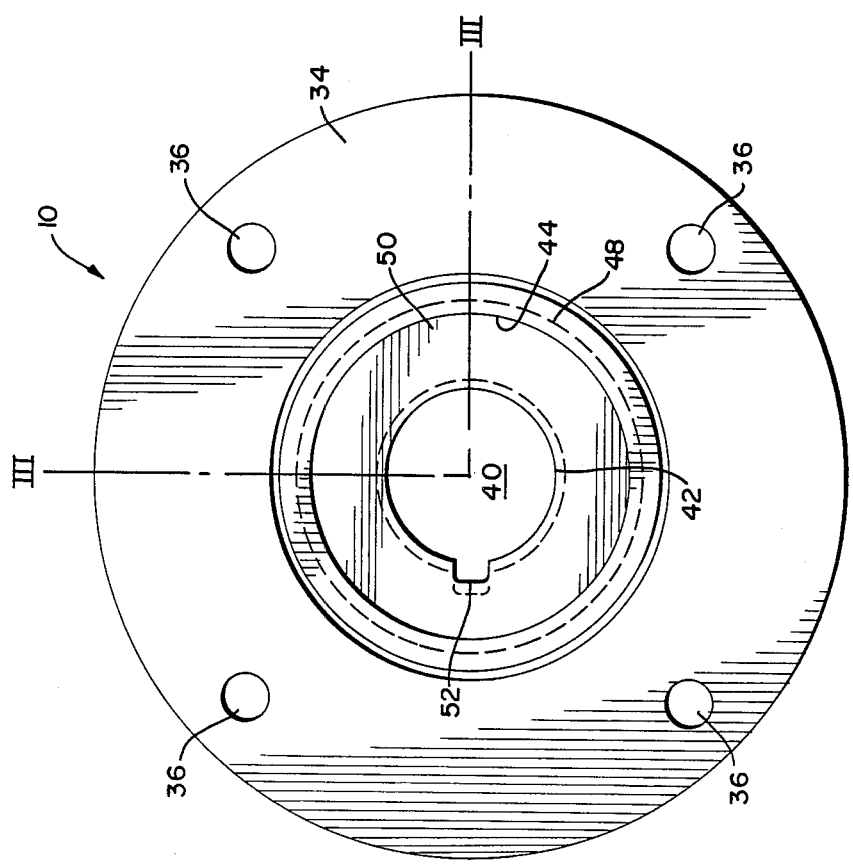

SHAFT COUPLING

FIELD OF THE INVENTION

The present invention is directed generally to a shaft coupling assembly. More particularly, the present invention is directed to a shaft coupling and cooperating jacking plug. Most specifically, the present invention is directed to a taper bore shaft coupling and jacking plug assembly for a propeller shaft of a marine vessel. The taper bore shaft coupling is utilized to join the tapered end of the propeller shaft to the transmission flange of the drive motor for a marine vessel such as a large motor yacht. The cooperating jacking plug facilitates removal of the taper bore shaft coupling from the tapered end of the propeller shaft, particularly in installations having minimal space availability. The jacking plug is used to impart a removal torque force to the shaft coupling which, in cooperation with a contemporaneously applied striking force delivered to a striking surface of the shaft coupling, is sufficient to allow the shaft coupling to be quickly removed from the shaft.

DESCRIPTION OF THE PRIOR ART

Shaft couplings are generally well know in the art and are used in various situations where it is necessary to join the end of a shaft to, for example another shaft or a connection member of a drive motor. Many such uses of shaft couplings are common in a large number of fields. Shaft couplings may be formed integrally with the shaft, but more typically are provided as a separate element which is removably attachable to the end of the shaft.

It is important that the shaft coupling not rotate with respect to the shaft to which it has been joined and thus the bore provided in the shaft coupling must be quite close in diameter to the diameter of the shaft on which the coupling is to be placed. Various adjuncts such as keyways and keys, set screws, and the like are often used to facilitate the non-slipping attachment of the shaft coupling to the shaft.

One typical expedient used in shaft couplings is to form the central bore in the shaft coupling as a taper and to form the shaft coupling receiving end of the shaft with a corresponding taper. The free end of the shaft is threaded and the bore of the shaft coupling is provided with an enlarged diameter end that will receive a shaft coupling nut. After the shaft coupling has been placed on the shaft, the shaft coupling nut is tightened onto the threaded shaft end. This forces the shaft coupling's tapered bore along the tapered end of the shaft thus effectively wedging the shaft coupling onto the end of the shaft. The positive benefit of such a coupling is its secure attachment to the shaft. The negative aspect is the same; the secure attachment of the shaft coupling to the shaft which makes the removal of the coupling quite difficult.

In certain situations it is necessary to remove the shaft coupling from the end of the shaft, but in prior art shaft couplings, as discussed above, this disengagement of the shaft coupling from the shaft has been difficult to accomplish. One such situation where it is often necessary to remove the shaft coupling from the end of the shaft is in the field of marine propulsion. When the shaft to which the coupling is attached is the propeller shaft of a vessel, it is sometimes necessary to remove the propeller shaft from its channel in the vessel's hull. Often this is accomplished by removal of the shaft by movement of the shaft in an aft or rearward direction. Since the shaft coupling would interfere with such movement, it must be removed prior to the removal of the shaft. In other instances when, for example, the vessel's motor is being removed or changed, it may be necessary to remove a shaft coupling of one size so that another shaft coupling of another size can be substituted. Also, in some instances the shaft coupling itself may fail or simply wear out and have to be replaced.

As can be envisioned, the area aboard a vessel, such as a motor driven pleasure yacht, in which the propeller shaft and shaft coupling are located, is apt to be quite cramped. As was mentioned above, a taper bore shaft coupling, once it has been tightened on the tapered end of the propeller shaft, is difficult to remove even in an area where there is plenty of space, and is particularly difficult to remove in a cramped environment such as within the hull of a boat. The typically resorted to procedure of using a hammer to "pound" the coupling off is hard to accomplish because of this shortage of space.

As will be appreciated, there exists a need for a shaft coupling assembly, particularly a taper bore shaft coupling assembly, which is structured to be readily removable from its cooperatively tapered shaft while not compromising its effectiveness as a shaft coupling. The shaft coupling of the present invention, as will be discussed subsequently, provides a secure shaft coupling which is readily removable, even in situations where there is limited space. As such, the shaft coupling assembly of the present invention is a significant advance in the art.

SUMMARY OF THE INVENTION

It is an object of the present invention to provide a shaft coupling.

Another object of the present invention is to provide a taper bore shaft coupling.

A further object of the present invention is to provide a taper bore shaft coupling for a propeller shaft.

Still another object of the present invention is to provide a shaft coupling assembly having a jacking plug receivable in a threaded bore in the shaft coupling.

Yet a further object of the present invention is to provide a shaft coupling having wrench receiving flat surface portions.

Even another object of the present invention is to provide a shaft coupling having inclined striking surfaces.

Still even a further object of the present invention is to provide a shaft coupling assembly that is removable from a shaft in an expeditions manner.

As will be discussed in greater detail in the description of the preferred embodiment which is set forth subsequently, the shaft coupling in accordance with the present invention is primarily intended for use with a propeller shaft of a marine vessel in which the propeller shaft has a tapered free end that receives the shaft coupling. The shaft coupling, which is comprised generally of a central stepped hub having a radially extending connection flange at one end of the hub, has a tapered bore extending axially through the central hub. One end of this bore is of enlarged diameter and is internally threaded. The exterior of the shaft coupling hub has several wrench receiving flats which are usable to hold the coupling in a desired position during coupling attachment and removal. Also, one or more angled striking surfaces are provided on the hub exterior to facilitate the use of a hammer or like tool to apply a removal impact force to the shaft coupling. A jacking plug having exterior threads of a size complimentary to the interior threads on the enlarged bore portion of the hub is utilized to apply a removal torque to the shaft coupling.

Once the shaft coupling nut has been removed from the threaded free end of the tapered shaft, the exteriorly threaded jacking plug is screwed into the enlarged interiorly threaded bore of the shaft coupling until it dead ends against the threaded shaft end. This jacking plug has a socket which receives the shank of a wrench, thereby allowing a removal torque to be applied to the shaft coupling. Should this force, by itself, not be sufficient to remove the shaft coupling, it can be supplemented by a striking force applied to the striking surface of the hub of the shaft coupling. In combination, the torque force and striking force will provide sufficienet removal force to remove even the most stubborn shaft coupling located in a restricted access area.

As will be apparent, the shaft coupling of the present invention is significantly easier to remove, particularly in areas of limited access, than were the prior art devices. The provision of the enlarged, internally threaded bore in the shaft coupling hub, which allows usage of the cooperatively externally threaded jacking plug, in cooperation with the angled striking surfaces, allow the exertion of both torque and impact forces concurrently to free the shaft coupling from the shaft. This is a marked advantage over the prior art shaft couplings which typically had to rely solely on impact forces. The provision of the angled striking surfaces alone on the shaft coupling of the present invention is a substantial advance in the art since it makes the shaft coupling much more easily struck by a hammer, particularly in a limited access area. The combination of the angled striking surfaces with the torque applying jacking plug results in a shaft coupling assembly which is far superior to prior art devices in ease of coupling removal in all applications, and particularly in those applications where space is limited.

BRIEF DESCRIPTION OF THE DRAWINGS

While the novel features of the shaft coupling in accordance with the present invention are set forth with particularity in the appended claims, a full and complete understanding of the invention may be had by referring to the detailed description of the preferred embodiment as is set forth hereinafter, and as is illustrated in the accompanying drawings in which:

FIG. 1 is a side elevation view, partly in section, of the shaft coupling of the present invention installed on a free end of a propeller shaft;

FIG. 2 is a side elevation view of the shaft coupling of FIG. 1 and further showing the jacking plug in place;

FIG. 3 is a side elevation view, partly in section, of the shaft coupling of the present invention with the removed section being taken along line III—III of FIG. 4;

FIG. 4 is a front elevation view of the shaft coupling of the present invention;

DESCRIPTION OF THE PREFERRED EMBODIMENT

Figure 5:
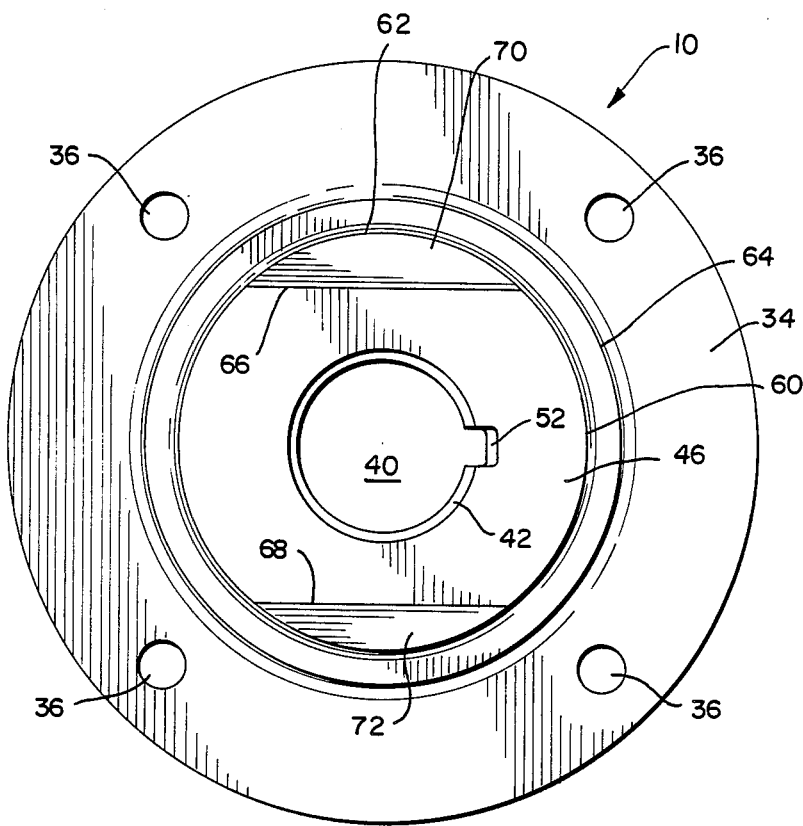
FIG. 5 is a rear elevation view of the shaft coupling.

Referring initially to FIG. 1, there may be seen, generally at 10, a preferred embodiment of a shaft coupling in accordance with the present invention. Shaft coupling 10 is shown in a preferred use environment to interconnect a transmission flange 12 of a propulsion means such as an internal combustion engine or the like (not shown) with a propulsion shaft assembly 14. As depicted in FIG. 1, propulsion shaft assembly 14 is a propeller driving assembly for a motor driven yacht and includes a propeller shaft 16 which carries a shaft log and packing box assembly 18. Propeller shaft 16 is provided with a tapered end 20 that terminates in a threaded propeller shaft end 22 which, as is seen in FIG. 1, receives a shaft nut 24 used to secure shaft coupling 10 to the tapered end 20 of the propeller shaft 16, as will be discussed in detail shortly. While shaft coupling 10 will hereinafter be discussed primarily in conjunction with a marine propeller system which has a tapered end, it will be understood that shaft coupling 10 may be used equally advantageously in any number of situations in which a shaft end is to be joined to another assembly such as another shaft, a power source, or any other such device.

Turning now to FIG. 3, shaft coupling 10 may be seen in more detail. Coupling 10 is typically formed as a one piece metal casting having a central stepped hub 30 which terminates at a first end 32 in an enlarged diameter coupling flange 34. As may be seen more clearly in FIG. 4, coupling flange 34 is provided with a plurality of spaced, coupling apertures 36 which are sized to receive coupling bolts 38, as shown in FIG. 1. These coupling bolts 38 are receivable in transmission flange 12 or a similar object to which shaft coupling 10 is to be joined.

Shaft coupling central stepped hub 30 carries a central bore 40 whose axis is parallel to the longitudinal axis of hub 30 and is generally perpendicular to the plane of coupling flange 34. Central bore 40 is divided into two segments, a shaft engaging bore segment 42 and an enlarged, internally threaded segment 44. Shaft engaging bore segment 42 of hub 30 extends inwardly into hub 30 from a second end 46 of hub 30, and as seen in FIG. 3, is a taper bore with the diameter of shaft engaging bore 42 reducing toward the center of hub 30. Internally threaded bore segment 44 extends inwardly into central hub 30 of shaft coupling 10 from the flange end 32 and is internally threaded, as depicted at 48. Internally threaded bore 44 has a constant diameter which is significantly larger than the diameter of shaft engaging bore 42, and terminates within central hub 30 at a generally planar wall surface 50. A keyway 52 may be provided on tapered shaft engaging bore 42 to provide space for a conventional locking key (not shown) that would also be receivable in a cooperating keyway 54 on tapered shaft end 20.

Again referring to FIG. 3, stepped central hub 30 of shaft coupling 10 is structured having a first outer hub surface 60 adjacent hub second end 46. First and second intermediate hub outer surfaces 62 and 64, respectively are formed having increasing diameters. Thus the outer surface of central hub 30 is formed having steps of increasing diameter starting with first outer hub surface 60 and ending at second intermediate hub surface 64 which abuts clamping flange 34. The specific number of outer surface steps for stepped hub 30 can vary with varying sizes of couplings.

As may be seen in FIGS. 3 and 5, first outer hub surface 60 of central hub 30 has a pair of opposed wrench receiving flats 66 and 68 formed as minor chords of generally cylindrical first outer hub surface 60. These flats 66 and 68 are generally parallel to each other, as seen in FIG. 5 and provide flat surfaces whereby a wrench can be placed about surface 60 to hold shaft coupling 10 against turning.

A pair of angled or inclined striking surfaces 70 and 72 extend between wrench receiving flats 66 and 68 on first outer hub surface 60 and first intermediate outer hub surface 62, as may be seen most clearly in FIG. 5. These striking surfaces, 70 and 72, as their names imply, provide surfaces that can be struck by a hammer or other impact tool to facilitate shaft coupling removal. The angled orientation of these surfaces allows them to be struck when coupling 10 is in tight quarters, such as within the hull of a vessel. The angle of inclination of inclined striking surfaces 70 and 72 may vary with different coupling use criteria. It has been determined that an angle of inclination of from about 30° to 50° from the vertical has been satisfactory and that an angle of generally about 40° has been most beneficial in actual useage.

Turning again now to FIG. 1, the installation of shaft coupling 10 of the present invention will now be discussed in greater detail. To install shaft coupling 10 on tapered end 20 of propeller shaft 16, the shaft is slid to the right, as viewed in FIG. 1, a distance sufficient to allow the taper bore shaft engaging segment 42 of coupling bore 40 to be slid over the tapered end 20 of propeller shaft 16. It will be understood that the tapers of propeller shaft 16 and of taper bore 42 correspond to each other and further that they are sized so that the threaded end 22 of propeller shaft 20 will extend into enlarged internally threaded coupling bore 44. A suitable key (not shown) may be placed in aligned keyways 52 and 54 of coupling 10 and propeller shaft 16, respectively. A suitably sized shaft nut 24 is then screwed onto the threaded end 22 of shaft 16 until it abuts planar wall surface 50 within coupling 10. Further tightening of shaft nut 24 will move coupling 10 to the right with respect to shaft 16 as seen in FIG. 1, until the telescoping interference fit between taper shaft end 20 and taper coupling bore 42 prevents any further movement. At this point, shaft coupling is secured on shaft 16 and may be used to join shaft 16 to transmission flange 12 by use of the spaced coupling bolts 38. Shaft coupling 10 cannot move to the left with respect to shaft 16 because of shaft nut 24 and, in time, will be apt to become more tightly attached to the shaft 16 because of thrust forces and the like.

Removal of the shaft coupling 10 in accordance with the present invention will be discussed with primary reference to FIG. 2. Should it become necessary to remove taper shaft coupling 10 from taper shaft end 20 of shaft 16, the coupling flange 34 is first disconnected from transmission flange 12 by removal of coupling bolts 38. Shaft 16 and shaft coupling 10 are then slid a sufficient distance to the right, as seen in FIGS. 1 and 2 to allow shaft nut 24 to be removed. A wrench may be applied across flats 66 and 68 on first outer hub section 60 to prevent coupling 10 and shaft 16 from turning during removal of shaft nut 24. Once this shaft nut 24 has been removed, a jacking plug 80, in accordance with the present invention, is threaded into the enlarged internally threaded bore 44 of central hub 30, as shown most clearly in FIG. 2.

Figures 6, 7:
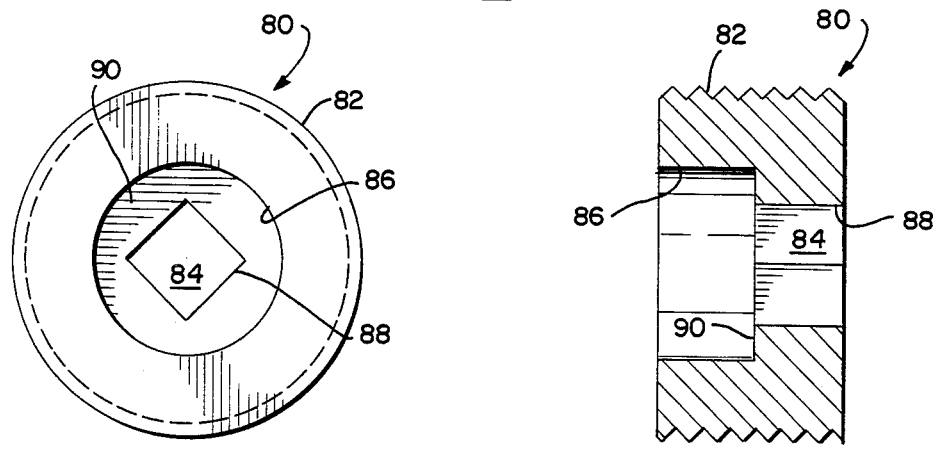
FIG. 6 is a sectional side view of the jacking plug of the present invention.
FIG. 7 is a rear elevation view of the jacking plug.

Jacking plug 80 is shown in detail in FIGS. 6 and 7. As may be seen there, plug 80 is generally cylindrical and has an outer surface 82 which is threaded to be engageable with the internal threads 48 on shaft coupling 10. Jacking plug 80 has a central through bore 84 which is divided into a first, enlarged shaft and encircling portion 86 and a second, wrench shank receiving portion 88 which, in the preferred embodiment, is rectangular, as shown most clearly in FIG. 7. An inner end wall 90 of enlarged portion 86 of jacking plug bore 84 is generally perpendicular to the threaded outer surface 82 of jacking plug 80.

Returning again to FIG. 2, once shaft nut 24 has been removed from threaded portion 22 of taper propeller shaft 16, jacking plug 80 is screwed into place within shaft coupling 10 by engagement between external threads 82 on jacking plug 80 and internal threads 48 on shaft coupling 10. Travel of jacking plug 80 to the right, as seen in FIG. 2 continues until the plug's inner end wall 90 engages the free end of threaded end 22 of taper shaft 20. At this point, if not before, the shaft portion 92 of a conventional ratchet wrench, shown schematically at 94, can be inserted into wrench shank receiving aperture 88 in jacking plug 80. Application of torque to jacking plug 80 through wrench 92 will tend to move shaft coupling 10 to the left since jacking plug 80 can now no longer move to the right. If the shaft coupling 10 has not become too securely joined to the taper shaft 20, this torque may be sufficient to move coupling 10. However, if it is not sufficient to free the coupling, suitable hammer or other blows can be delivered to the angled striking surfaces 70 and 72. This contemporaneous combination of torque supplied through jacking plug 80 and impact or striking forces supplied to striking surfaces 70 or 72 will be sufficient to free shaft coupling 10 from taper shaft 20.

As was discussed previously, this shaft coupling is particularly useful in an installation where space is limited, such as within the hull structure of a boat. The application of torque and impact forces at the same time will allow the removal of a shaft coupling much more expeditiously than would have been the case with prior art devices. Angulation of the striking surfaces positions them so that they can be struck in a location with limited access space. Standardization of the sizes of the jacking plug and the internally threaded coupling bore allows a number of different sized shaft couplings to be removed without requiring a large capital expenditures for equipment. Thus it will be seen that the shaft coupling assembly of the present invention makes shaft coupling removal much more easily accomplishable with much less difficulty than was afforded by prior art devices.

While a preferred embodiment of a shaft coupling assembly in accordance with the present invention has been fully and completely set forth hereinabove, it will be apparent to one of skill in the art that a number of changes in, for example, the sizes of the shaft and shaft coupling, the types of material used for the shaft coupling, the overall shape of the coupling flange and the number and placement of coupling bolt holes, the shape of the keyway and the various cooperative thread sizes and the like can be made without departing from the true spirit and scope of the present invention which is accordingly to be limited by the following claims.

I claim:

1. A shaft coupling assembly securable to a shaft having a tapered end which terminates in a threaded free end, said shaft coupling comprising:

a shaft coupling hub having a central stepped hub portion;

a shaft coupling flange extending generally radially outwardly from a first end of said hub;

a central bore in said hub, said bore extending axially through said hub and being generally perpendicular to said coupling flange, said central bore including a shaft engagable taper bore segment and an internally threaded, jacking plug receivable enlarged bore segment; and at least one inclined striking surface on an outer surface of said central stepped hub portion, said at least one inclined striking surface extending between a first outer hub surface at a second end of said hub and a first intermediate outer hub surface.

2. The shaft coupling assembly of claim 1 wherein said hub includes first and second opposed inclined striking surfaces.

3. The shaft coupling assembly of claim 2 wherein said inclined striking surfaces are inclined at an angle of generally about 40° to the vertical.

4. The shaft coupling assembly of claim 1 wherein said shaft engageable taper bore segment extends inwardly into said hub from said second end of said hub.

5. The shaft coupling assembly of claim 4 wherein said internally threaded bore segment extends inwardly into said hub from said first end of said hub.

6. The shaft coupling assembly of claim 5 wherein said internally threaded bore segment terminates in a wall surface.

7. The shaft coupling assembly of claim 1 further including a jacking plug postionable in said internally threaded enlarged bore segment.

8. The shaft coupling assembly of claim 7 wherein said jacking plug has an externally threaded outer cylindrical surface.

9. The shaft coupling assembly of claim 7 wherein said jacking plug includes a central through bore having an enlarged shaft end receiving portion and a wrench shaft receiving portion.

10. A method of removing a shaft coupling having an encompassing taper bore from an encompassed taper ended shaft which terminates in a threaded end, said method including;
   removing a shaft nut from said threaded end of said bore ended shaft;
   positioning an externally threaded jacking plug in an enlarged internally threaded segment of said taper bore of said shaft coupling;
   rotating said jacking plug with respect to said shaft coupling to move said jacking plug into said enlarged internally threaded segment and into engagement with said threaded end of said shaft;
   applying a torque force on said jacking plug; and
   applying a contemporaneous impact force to a striking surface on said shaft coupling thereby separating said shaft coupling and said shaft.

11. A shaft coupling assembly securable to a shaft having a tapered end portion which terminates in a threaded end, said shaft coupling assembly comprising:
   a shaft coupling hub;
   a shaft coupling flange extending generally radially outwardly from a first end of said hub;
   a central bore in said hub, said bore extending axially through said hub and being generally perpendicular to said coupling flange, said central bore including a shaft engagable taper bore segment and an internally threaded, jacking plug receivable enlarged bore segment;
   at least one inclined striking surface on an outer surface of said central hub; and
   a jacking plug positionable in said internally threaded enlarged bore segment, said jacking plug including a central through bore having an enlarged shaft end receiving portion and a wrench shaft receiving portion.

* * * * *